United States Patent [19]

Takechi et al.

[11] Patent Number: 5,154,986
[45] Date of Patent: Oct. 13, 1992

[54] SHUT-OFF DEVICE FOR FUEL CELL SYSTEM

[75] Inventors: Hiroaki Takechi; Yutaka Mizuno; Tomio Anma, all of Iwata, Japan

[73] Assignee: Yamaha Hatsudoki Kabushiki Kaisha, Japan

[21] Appl. No.: 673,359

[22] Filed: Mar. 22, 1991

[51] Int. Cl.$^5$ .............................................. H01M 8/04
[52] U.S. Cl. ........................................ 429/23; 429/24
[58] Field of Search ................... 429/23, 24; 323/271, 323/272

[56] References Cited

U.S. PATENT DOCUMENTS

| | | | |
|---|---|---|---|
| 3,389,018 | 6/1968 | Dowgiallo | 429/23 |
| 3,666,562 | 5/1972 | Sprengel | 429/23 X |
| 4,365,287 | 12/1982 | Kettle et al. | 323/272 X |
| 4,648,020 | 3/1987 | Vinciarelli | 323/272 X |
| 4,713,742 | 12/1987 | Parsley | 323/272 X |

*Primary Examiner*—Stephen Kalafut
*Attorney, Agent, or Firm*—Bacon & Thomas

[57] ABSTRACT

A device for shutting-off a fuel cell system includes a main power switch and a parallel latching switch circuit. The latching switch circuit remains closed until all operations necessary to safely shut down the system have been carried out and verified.

6 Claims, 5 Drawing Sheets

SHUT-OFF DEVICE FOR FUEL CELL SYSTEM

BACKGROUND OF THE INVENTION

1. Field of the Invention

This invention relates to an operational control unit for a fuel cell system including a fuel processor and a fuel cell, and more particularly to an operational shut-down device for the fuel cell system.

2. Description of Related Art

Recently, it has been proposed to provide a compact power supply offering a ready source of electrical energy that may be utilized for a wide variety of purposes. For example, such compact power supplies can be employed for providing electrical power for campsites, small watercraft not having their own power systems, and a wide variety of other purposes. A power supply of this type may include an electrical generator that is driven by a small internal combustion engine, such as a single cylinder, two-cycle, crankcase compression engine. For safety and other purposes, it is desirable if the engine can be powered by a gaseous fuel of the type that is stored under pressure in a container. Such fuel sources are readily available.

Such fuel cell systems are generally equipped with a fuel processor to generate the fuel gas. The fuel processor, along with the fuel cell, is operationally controlled by a control unit.

Conventionally, when the operation of this type of fuel cell system is to be halted while turning off the external load through a main switch, the power to the control unit must be separately turned off. Turning off the control unit at this time has several disadvantages, however. First, if the fuel processor's combustion burner is not stopped at the time operation of the cell is stopped, the burner in the fuel processor continues to burn until operations are resumed, thus wastefully consuming fuel. Also, when the system is a hybrid of the type including both fuel cells and storage batteries, then at the time operations are halted, the charge level for the storage batteries may fall below the rated value, which can impair the smooth restarting of operations.

Accordingly, when such conventional fuel cell systems are shut down, operations supervisors must pay close attention to the above factors, and only then shut down power to the controller.

SUMMARY OF THE INVENTION

It is an objective of this invention to solve the above-mentioned problems so that when an operation supervisor simply turns the main switch of the fuel cell system to off, the safety concerns in the operation of the fuel cell system will be automatically resolved by an operation shut-down or shut-off device for the fuel cells without the need for additional monitoring of the system and separately switching off the control unit.

In order to attain the above-described objective, a preferred embodiment of the invention provides an operation shut-off device for a fuel cell system of the type including a fuel processor for the generation of fuel gas, and in which the control unit is equipped with an electric power circuit from the fuel cell which comprises a double input system, including a first input circuit which operates through a main switch or a ganged input switch and a second input circuit which provides input through a latching switch circuit, the latching switch circuit moving to the off position only if the main switch has been turned to off, and the fuel cell system is in a safely shut-down state. Thus, the fuel cell system may be shut down to a safe state simply by turning the main switch off without having to separately shut off the control unit.

DETAILED DESCRIPTION OF THE PREFERRED EMBODIMENTS

Figure 1:
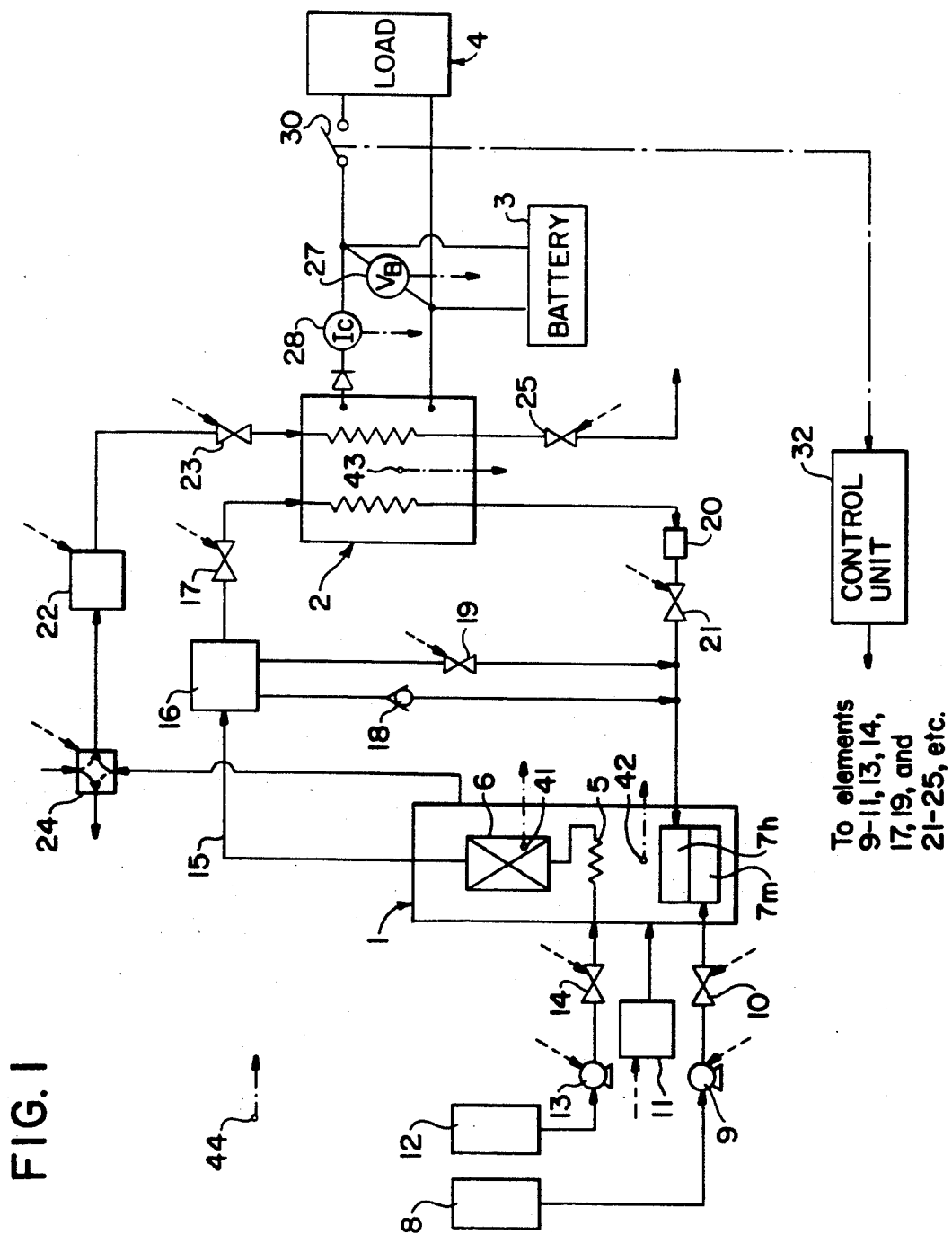
FIG. 1 is a schematic diagram of a fuel cell system equipped with a shut-down controller device according to a preferred embodiment of the invention.

As shown in FIG. 1, a fuel processor 1, also known as a fuel quality improving device, generates hydrogen for use as a fuel gas. The fuel gas and air (hydrogen and oxygen, respectively) react in a fuel cell 2 to generate electricity. Connected in parallel to fuel cell 2 is a storage battery 3. A load 4 is connected to both fuel cell 2 and storage battery 3. In addition to supplying electricity to load 4, fuel cell 2 also supplies electricity to charge storage battery 3 when the electric capacity of the storage battery is insufficient.

Fuel processor 1 is equipped with an evaporator 5 which vaporizes the liquid raw materials used to generate the hydrogen, and a reaction layer in which the raw materials vaporized by the evaporator 5 react. Below evaporator 5 are two types of heating burners, 7M and 7H. A blower 11 is situated near the base of the fuel processor.

A fuel tank 8 stores fuel for the burners. An example of a suitable fuel for the burners is methanol. The methanol is supplied to burner 7m through pump 9 and valve 10, where it is burned with the aid of air supplied from blower 11 to make a hot gas. The hot gas heats evaporator 5 and reaction layer 6 to generate the hydrogen. A fuel tank 12 is used to store the liquid raw materials, a mixture of methanol and water, which are supplied to evaporator 5 via pump 13 and valve 14.

The fuel gas is primarily composed of hydrogen which is generated at the reaction layer 6 and supplied to fuel cell 2 via supply pipe 15, storage tank 16 and valve 17. It is retained temporarily as fuel gas in storage tank 16 from where prescribed quantities of the gas are fed to the fuel cell 2. Surplus fuel gas is vented by relief valve 18 and/or is sent to burner 7h through bypass valve 19, where it is fed into the heating process. Burner 7h is also supplied, via scavenger or reclaimer device 20 and valve 21, with unreacted, excess hydrogen gas which has been exhausted from fuel cell 2.

In fuel cell 2, the air including oxygen for reaction is supplied by blower 22 and valve 23 and reacts with the hydrogen fuel gas supplied through the pipe 15. A four-way valve 24 is connected at the upstream side of blower 22, allowing the selection of either low temperature atmospheric air or high temperature air from fuel processor 1. Surplus air supplied to fuel cell 2 which remains unreacted is exhausted to the outside through pipe 25.

As shown in FIG. 1, fuel cell 2 and storage battery 3 are connected in parallel so that they each may supply electric power to external load 4. Load 4 is turned on and off by manually operated main switch 30. In addition to being an on-off switch for external load 4, switch 30 is also the main switch for the power supply line to control unit 32. The electrical circuit for load 4 is also connected to a current sensor 28 which detects the output current Ic from fuel cell 2, and a voltage sensor 27 which detects the terminal voltage $V_B$ of the storage battery 3.

Controller 32 is a microcomputer having a computational unit and memory. Controller unit 32 receives inputs from storage battery 3 via voltage sensor 27, further inputs in the form of an output current from current sensor 28, and temperature inputs from sensors 41, 42, 43 and 44. Sensors 41, 42, 43, and 44 measure, respectively, the reaction layer temperature, the burner temperature, the fuel cell reaction temperature, and the ambient air temperature. The outputs of control unit 32 are control signals to pumps 9 and 13; blowers 11 and 22; and valves 10, 14, 17, 19, 21, 23, 24 and 25. Control unit 32 thus controls the operation of fuel processor 1 and the fuel cell 2.

Figure 2:
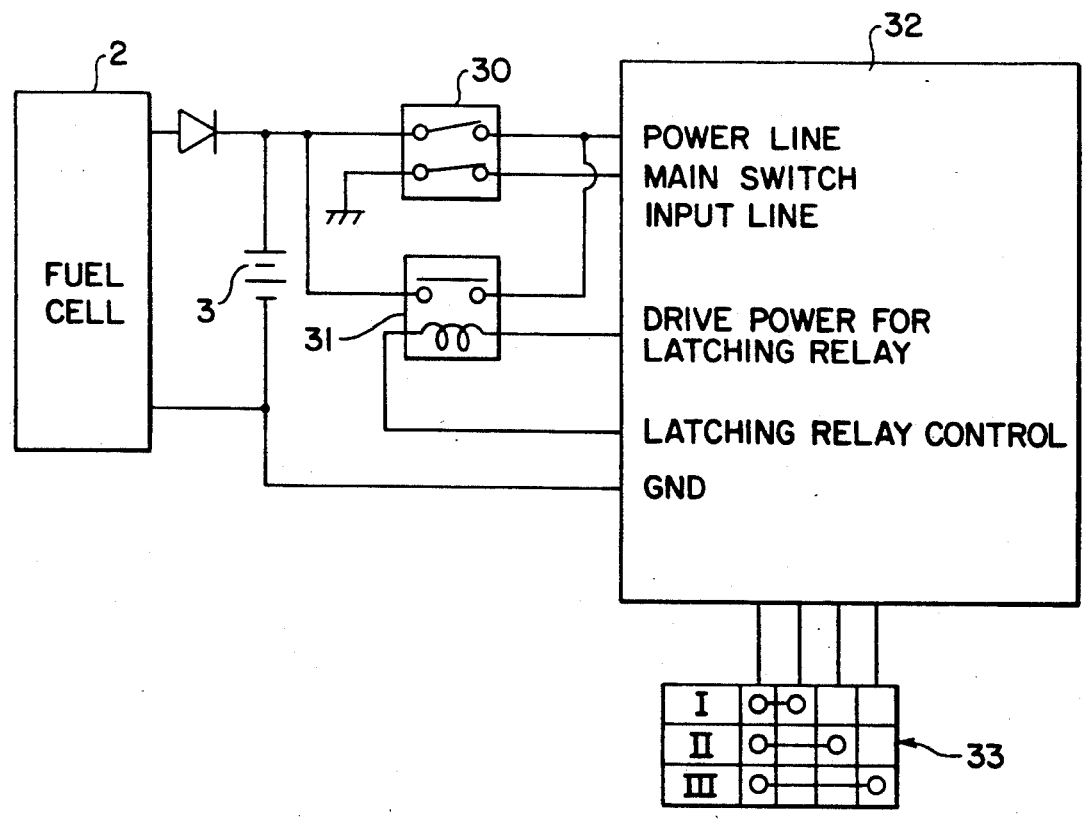
FIG. 2 is a circuit diagram for the shut-down device of FIG. 1.

FIG. 2 shows the input power circuitry for controller unit 32. The power circuitry is a double system. The first system is an assembly which is linked to or through the main switch 30 at the load. The on-off condition of this main switch is constantly monitored by the state of the input line of main switch 30 while the fuel cell is in operation. Various additional elements of the input power circuitry which are shown in FIG. 4 have been omitted from FIG. 2 for clarity.

The second system is a latching switching circuit including a latching relay 31. Latching relay 31 is latched on simultaneously with the turning on of main switch 30, and maintains operations while it is latched on. When latching relay 31 is in the on condition, even if main switch 30 is turned off, latching relay 31 does not immediately revert to the off condition. As will be described in more detail below, latch relay 31 only turns off once verification has been made of the safe shut-down of the fuel cell system.

Figure 4:
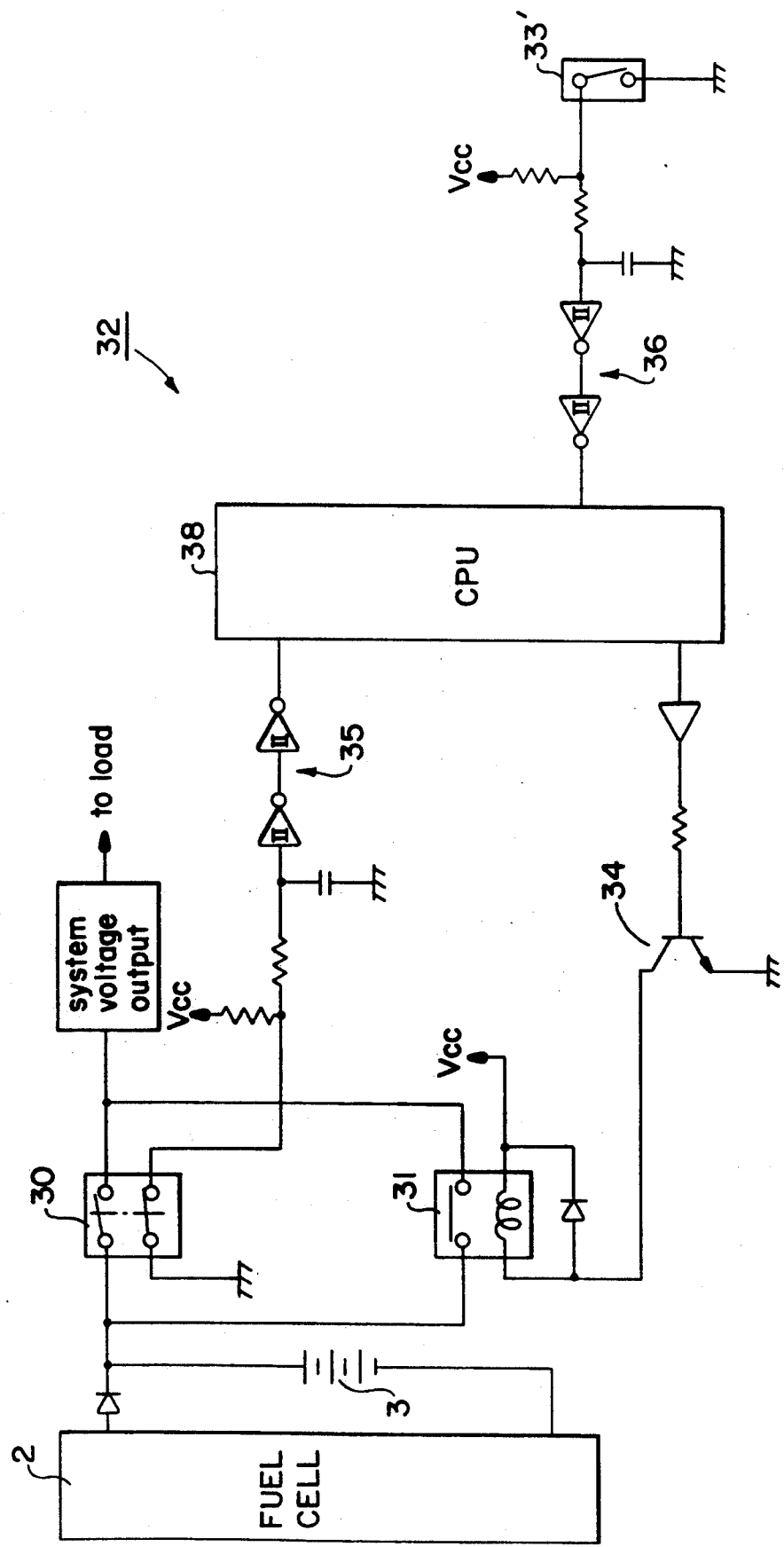
FIG. 4 is a more detailed circuit diagram of the circuit shown in FIG. 2.
Figure 5:
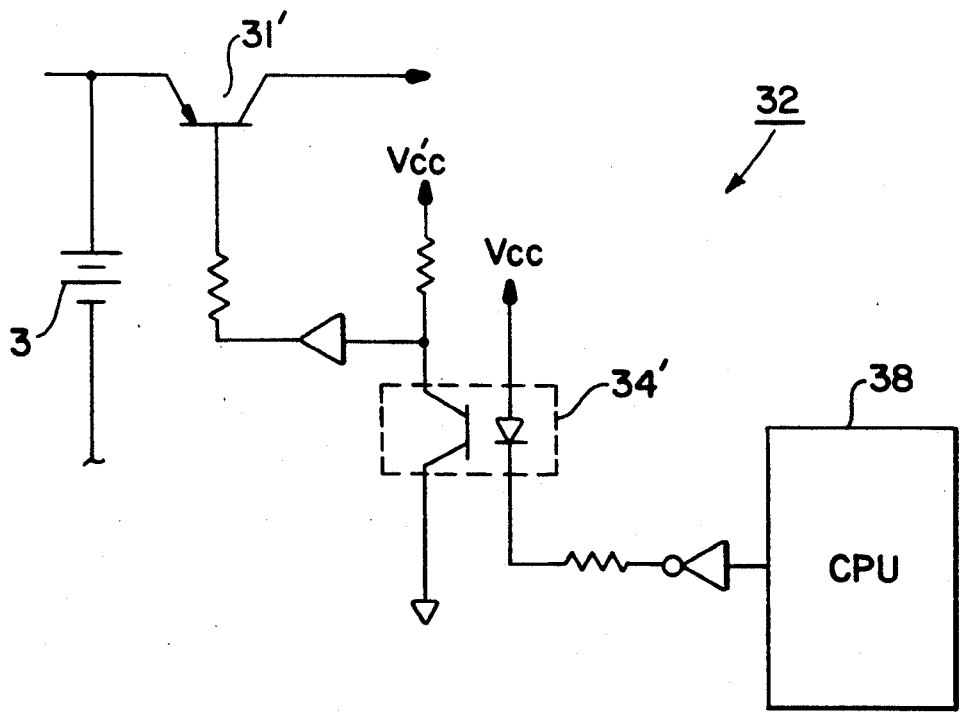
FIG. 5 is a circuit diagram showing a variation of the circuit of FIG. 4.

As is shown in greater detail in FIG. 4, the power circuit for control unit 32 includes noise filters 35 and 36 and transistor 34 as well as switches 30 and 31. Mode changeover switch 33 of FIG. 2 is represented in FIG. 4 by element 33'. Alternatively, latching relay 31 may be replaced by a bipolar transistor 31' as shown in FIG. 5, or by a field effect transistor. In the alternate embodiment shown in FIG. 5, element 34' is a photocoupler which controls the on-off state of transistor 31'. In both embodiments, a computer CPU 38 monitors switch 30 and controls switch 32. Programming of CPU 38 may be accomplished by any of a number of well known methods to control switch 31 to remain on in order to achieve safe shut-down of the system after main switch 30 has been switched to off.

Controller unit 32 maintains relay 31 in an on state until the following conditions are met: In order to achieve a safe shut-down, the fuel cell system must be left in such a state after the cessation of operations that there will be no problem in restarting operations for the fuel cell system. The functions of the system must not be degraded or damaged in any way. In order for there to be a safe shut-down, the following four conditions therefore must be met depending on the type of system to which the control unit is applied:

1. The battery charge must be above the rated level;
2. The combustion burner must not still be operating;
3. New air or inert gas beyond a certain level must be present in the fuel cell; and
4. The temperature of the reaction layer must be below the activation point of the catalyst, or inert gas beyond a certain level must be present in the catalyst layer of the fuel processor, so that activity in the reaction layer ceases.

Condition 1 applies only to a hybrid system which also contains a storage battery. If the storage battery charge is below the rated level at the cessation of operations, one would not be able to smoothly restart the fuel cell system. The charge on the storage battery is determined by voltage sensor 27, and depending upon the value detected by voltage sensor 27, latching relay 31 is left on whenever necessary to charge the battery to its rated level.

Conditions 2–4 are not confined to a hybrid system. In each case, power to the respective sensors and auxiliary equipment is supplied via latching relay 31. Condition 2 relates to wasting of fuel. Operation of the combustion burner is detected by temperature sensor 42, which ensures that pump 9 and valve 10 are properly shut off to attain a safe shut-down condition.

Condition 3 indicates that water vapor remains inside the fuel cell. If water vapor remains within the fuel cell, phosphoric acid in the electrolyte absorbs this water and causes early deterioration of the fuel cell. Safe shut-down is accomplished by connecting the four-way valve 24 to the outside air and by using blower 22 to force new air into the cell, or to introduce an inert gas such as nitrogen into the cell for a set period of time following the shut-down of the fuel cell. Use of relay 31 permits power to be supplied for these purposes. Instead of eliminating the water vapor by performing the above operation for a set period of time, it is also within the scope of the invention to place a water vapor sensor in the fuel cell and use the detection signal from that sensor to halt the purging operation and ensure a safe shut-down.

Finally, in respect to condition 4, a reaction layer temperature above the activation point of the catalyst invites the deterioration of the catalyst in the reaction area of the fuel processor and shortens the longevity of the reaction layer. This condition is detected by using temperature sensor 41 to measure the temperature of the catalytic layer and signal control blower 11 so that cool outside air is introduced to cool down the catalyst and ensure a safe shut-down.

In the above-described exemplary fuel cell system, latching switch circuit 31 also allows the following modes after the shut-down of operations until the latching switch circuit is turned off: idle operations, stoppage after battery charging, stoppage without battery charging. Each of these modes is illustrated in the flow chart of FIG. 3. Selection from these three stop modes is done manually by the operator using stop mode changeover switch 33, shown in FIG. 2, so that the selection is fed into controller unit 32 (and ultimately to CPU 38 of the embodiments shown in FIGS. 4 and 5).

Figure 3:
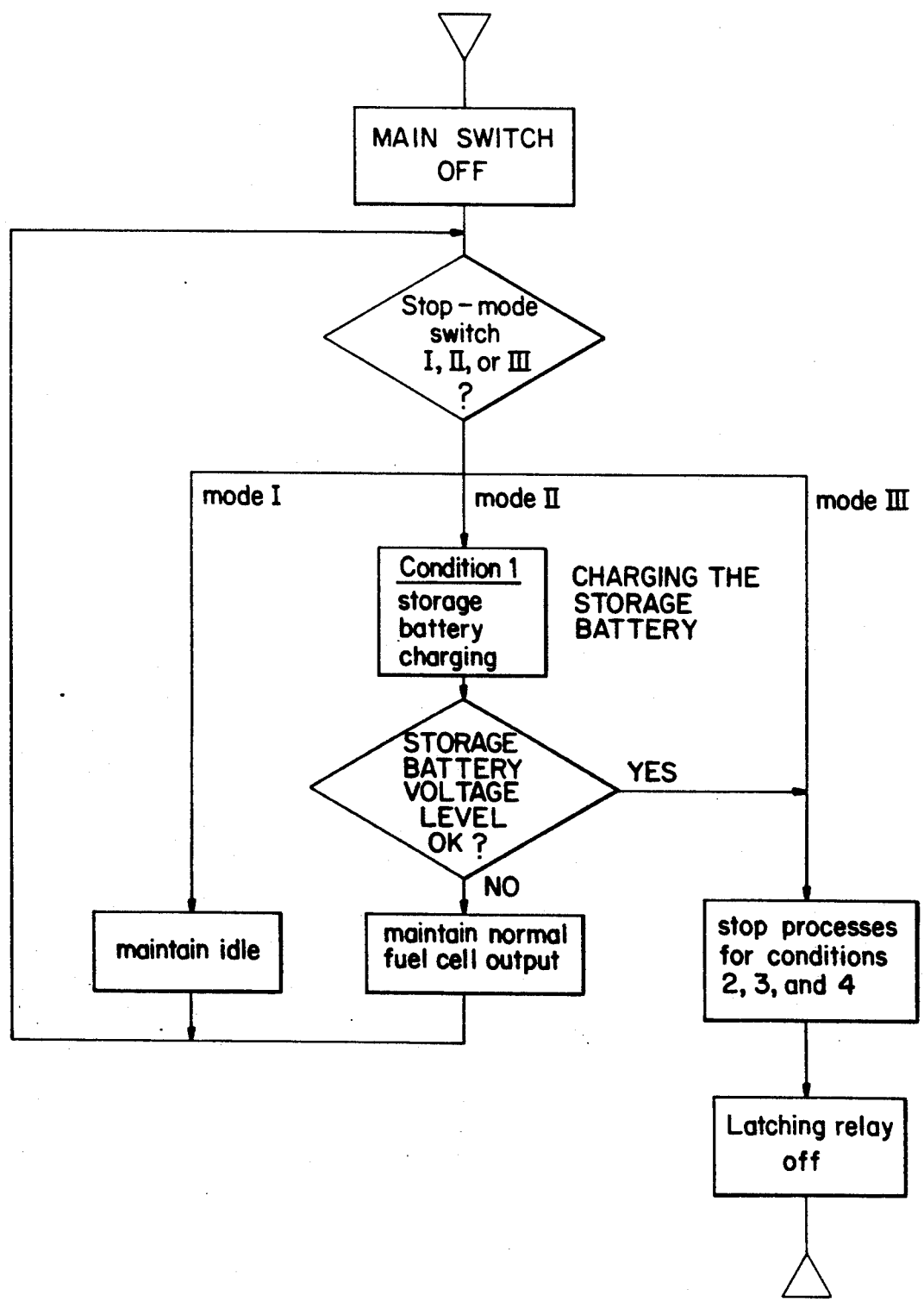
FIG. 3 is a flowchart showing a shut-down method for a fuel cell according to a preferred method of practicing the invention.

One of these stop modes may be fed through stop mode switch 33, and then when main switch 30 is turned off, shut-down operations such as shown by the flow chart in FIG. 3 may be implemented. In this case, if stop mode II has been selected, the safe shut-down processing for condition 1 is implemented, but if stop mode III has been selected, only the safe shut-down procedures for conditions 2, 3, and 4 are implemented. Thus, it is possible to have a safe, automatic shut-down of fuel cell operations without any safety worries.

In summary, the operation shut-down device of the preferred embodiment sets up two power circuit systems with respect to the control unit for the fuel cell system: a main switch or a main switch-linked system 30, and a latching switch circuit 31 which, after the main switch has been turned off, performs a safe shut-down of the fuel cell system. This means that the operator merely has to turn the main switch off, knowing that the safety questions within the fuel cell will be taken care of automatically.

It will of course be appreciated that numerous variations of the above-described preferred embodiment may be made within the scope of the invention. Consequently, it is intended that the invention not be limited to the above-described embodiments, but rather solely by the appended claims.

We claim:

1. A fuel cell system, said fuel cell system including a control unit, fuel processor means for the generation of fuel gas, electricity generation means including a fuel cell for generating electricity using the fuel gas generated by the fuel processor means, and a device for shutting-off the fuel cell system, wherein said device comprises:

an electric power circuit including means for connecting said electric power circuit between said fuel cell system and the control unit, said electric power circuit also including main switch means for opening said electric power circuit when switched to off and closing said electric power circuit when switched to on; and latching switch circuit means connected in parallel to said main switch means for shutting off power from said fuel cell system only after said main switch means has opened said electric power circuit and fuel cell system is in a safely shut-down state.

2. A fuel cell system as claimed in claim 1, wherein said fuel cell system is a hybrid system including a storage battery, and said control unit comprises means for maintaining said latching switch circuit means in a closed state to deliver power from said fuel cell to said battery until a voltage output from said battery is greater than that necessary to restart the system.

3. A fuel cell system as claimed in claim 1, wherein said fuel cell system includes a pump and valve for supplying fuel to a combustion burner in said fuel processor means and said control unit comprises means for causing said latching switch circuit means to shut off power from said fuel cell system only after said pump and valve for supplying fuel to a combustion burner in said fuel processor means are shut off.

4. A fuel cell system as claimed in claim 1, wherein said fuel cell system includes means for purging water vapor from said fuel cell and said control unit comprises means for causing said latching switch circuit means to shut off power from said fuel cell system only when said water vapor to be is purged from said fuel cell.

5. A fuel cell system as claimed in claim 1, wherein said fuel cell system includes means for cooling a catalytic layer in said fuel processor, and wherein said control unit comprises means for causing said latching switch circuit means to shut off power from said fuel cell system only after a temperature of said catalyst layer has been cooled below a predetermined temperature.

6. A fuel cell system as claimed in claim 1, further comprising means including a manually operated mode selector switch for selecting between a plurality a different shut-down modes, each requiring the latching switch circuit means to be left on until different predetermined conditions have been satisfied to ensure safe shut-down of the fuel cell system.

* * * * *